(12) United States Patent
Kobayashi et al.

(10) Patent No.: US 11,174,626 B2
(45) Date of Patent: Nov. 16, 2021

(54) MIXER FAUCET

(71) Applicant: Takagi Co., Ltd., Fukuoka (JP)

(72) Inventors: Satoshi Kobayashi, Kitakyushu (JP); Takayuki Sunaba, Kitakyushu (JP)

(73) Assignee: TAKAGI CO., LTD., Kitakyushu (JP)

( * ) Notice: Subject to any disclaimer, the term of this patent is extended or adjusted under 35 U.S.C. 154(b) by 0 days.

(21) Appl. No.: 17/040,914

(22) PCT Filed: Dec. 12, 2018

(86) PCT No.: PCT/JP2018/045761
§ 371 (c)(1),
(2) Date: Sep. 23, 2020

(87) PCT Pub. No.: WO2019/187381
PCT Pub. Date: Oct. 3, 2019

(65) Prior Publication Data
US 2021/0017742 A1   Jan. 21, 2021

(30) Foreign Application Priority Data

Mar. 26, 2018   (JP) .............................. JP2018-057756

(51) Int. Cl.
*F16K 11/078* (2006.01)
*E03C 1/044* (2006.01)

(52) U.S. Cl.
CPC ............ *E03C 1/044* (2013.01); *F16K 11/078* (2013.01)

(58) Field of Classification Search
CPC .... E03C 1/044; F16K 11/078; F16K 11/0782; F16K 11/0787; F16K 11/0743
See application file for complete search history.

(56) References Cited

U.S. PATENT DOCUMENTS

| | | | |
|---|---|---|---|
| 5,080,134 A * | 1/1992 | Orlandi | F16K 11/0787 137/625.17 |
| 5,329,958 A * | 7/1994 | Bosio | F16K 11/078 137/269 |
| 5,402,827 A * | 4/1995 | Gonzalez | F16K 11/078 137/625.17 |
| 6,439,581 B1 | 8/2002 | Chang | |

(Continued)

FOREIGN PATENT DOCUMENTS

| | | |
|---|---|---|
| JP | 59039370 U | 3/1984 |
| JP | 62-2365 Y2 | 1/1987 |

(Continued)

*Primary Examiner* — Reinaldo Sanchez-Medina
(74) *Attorney, Agent, or Firm* — Alleman Hall Creasman & Tuttle LLP

(57) ABSTRACT

Provided is a mixer faucet that can suppress the occurrence of water leakage. A mixer faucet includes: a fixed valve body including a hot water supply hole, a cold water supply hole, and a drain hole; a movable valve body that includes a flow path forming recess and is configured to slide on the fixed valve body; and a handle configured to control the movable valve body. The fixed valve body includes a collection groove that is not connected to either the hot water supply hole or the cold water supply hole and is connected only to the drain hole. The collection groove can capture water leaking from the hot water supply hole, the cold water supply hole, or the drain hole. The captured water can flow into the drain hole through the collection groove.

20 Claims, 14 Drawing Sheets

(56) References Cited

U.S. PATENT DOCUMENTS

| | | | | |
|---|---|---|---|---|
| 7,185,676 | B2* | 3/2007 | Huang | F16K 11/0787 |
| | | | | 137/625.17 |
| 7,373,950 | B2* | 5/2008 | Huang | F16K 11/0785 |
| | | | | 137/625.17 |
| 9,464,417 | B2* | 10/2016 | Chen | F16K 11/0787 |

FOREIGN PATENT DOCUMENTS

| JP | 01039973 U | 3/1989 |
|---|---|---|
| JP | 03075372 U | 7/1991 |
| JP | 2017002631 A | 1/2017 |

\* cited by examiner

MIXER FAUCET

TECHNICAL FIELD

The present disclosure relates to a mixer faucet.

BACKGROUND ART

As disclosed in JP2017-2631A, a mixer faucet including a fixed valve body and a movable valve body has been known. The fixed valve body has a hot water supply hole, a cold water supply hole, and a drain hole. The movable valve body has a flow path forming recess. The movable valve body is moved by operating a handle. The movable valve body slides on the fixed valve body. With the movement of the movable valve body, the positional relationship between the movable valve body and the fixed valve body changes. As a result, the amount of discharge water and the mixing ratio of hot and cold water change.

The upper surface of the fixed valve body is a flat smooth surface. The lower surface of the movable valve body is also a flat smooth surface. The watertightness can be ensured through contact between these flat smooth surfaces.

CITATION LIST

Patent Literature

Patent Literature 1: JP2017-2631A

SUMMARY OF THE INVENTION

Problems to be Solved by the Invention

From the viewpoint of ensuring the watertightness, a sealing pressure is applied between the fixed valve body and the movable valve body. However, water leakage from between the fixed valve body and the movable valve body may be caused by aging, abrasion, and the like of the valve bodies. Water that has leaked from between the fixed valve body and the movable valve body flows over from the lower side of the handle and then reaches, for example, the boundary between the faucet and a faucet fixing portion (such as a sink).

If the sealing pressure is increased in order to suppress the occurrence of water leakage, the movable valve body is subjected to a higher sliding resistance when it slides on the fixed valve body. The operability of the handle is lowered by this increase in sliding resistance. In addition, increasing the sealing pressure also increases the risk of wringing (a phenomenon in which the movable valve body sticks firmly to the fixed valve body).

The present disclosure relates to a novel configuration with which the occurrence of water leakage can be suppressed.

Solution to Problems

In one aspect, the present disclosure provides a mixer faucet including: a fixed valve body including a hot water supply hole, a cold water supply hole, and a drain hole; a movable valve body that includes a flow path forming recess and is capable of sliding on the fixed valve body; and a handle that is capable of controlling the movable valve body. The fixed valve body includes a collection groove that is not connected to either the hot water supply hole or the cold water supply hole and is connected only to the drain hole.

Advantageous Effects of Invention

In one aspect, the occurrence of water leakage is suppressed.

DESCRIPTION OF EMBODIMENTS

Embodiments of the present disclosure will be described in detail below with reference to the drawings as necessary. In the following, the terms "cold water" and "hot water" are used. For the purpose of distinguishing liquid from a hot water supply hole and liquid from a cold water supply hole, the terms "hot water" and "cold water" are used selectively, when necessary. On the other hand, in some descriptions, the term "water" is used to collectively refer to liquid from a hot water supply hole and from a cold water supply hole.

Figure 1:
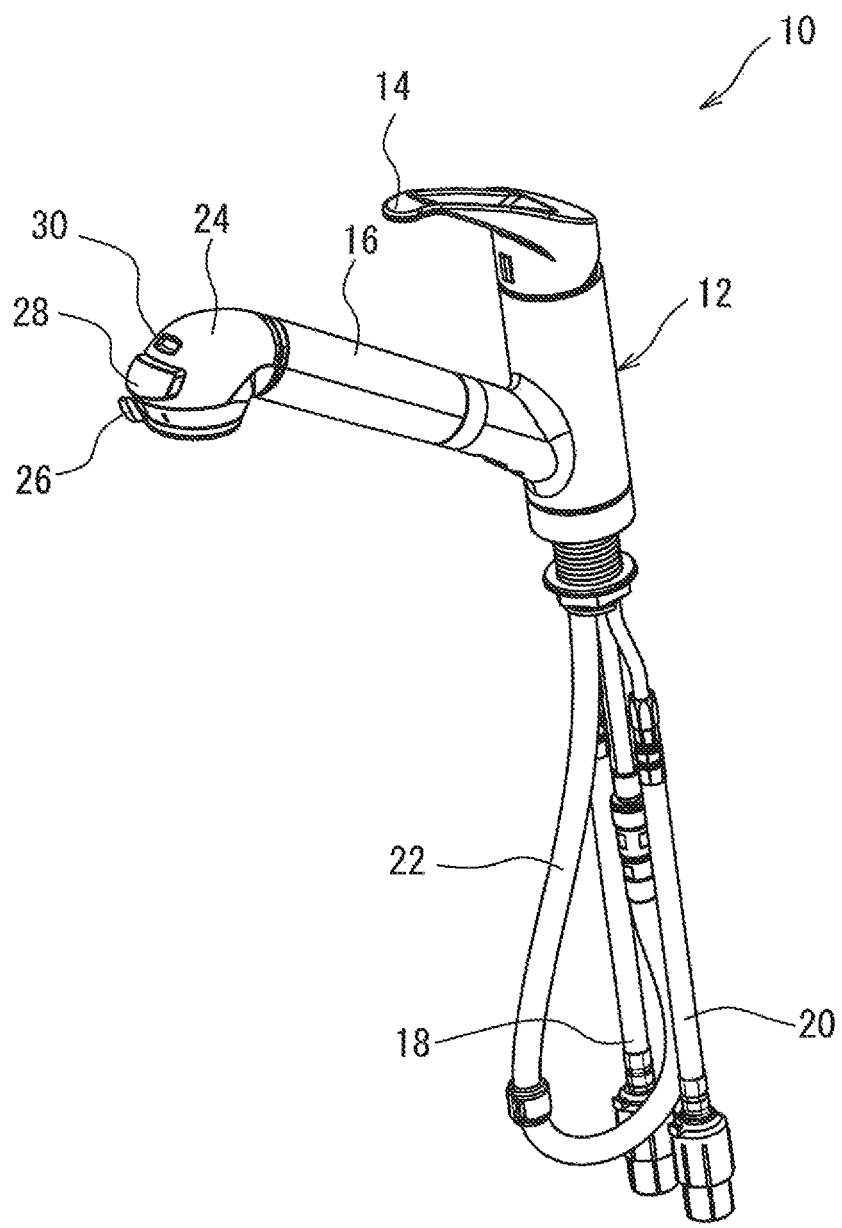
FIG. 1 is a perspective view of a mixer faucet according to a first embodiment of the present invention.

FIG. 1 is a perspective view of a mixer faucet 10 according to a first embodiment. The mixer faucet 10 includes a main body 12, a handle 14, a discharge portion 16, a hot water inlet pipe 18, a cold water inlet pipe 20, and a discharge pipe 22. The discharge portion 16 includes a head 24. The head 24 includes a switching lever 26. Switching between shower discharge and normal discharge can be achieved by operating the switching lever 26. The mixer faucet 10 is applicable to use in, for example, a kitchen or a washbasin.

The head 24 also includes a switching button 28 and a display portion 30. A water purification cartridge (not shown) is accommodated in the discharge portion 16. The switching button 28 is used to perform switching between a flow path that passes through the water purification cartridge and a flow path that does not pass through the water purification cartridge. When the flow path that passes through the water purification cartridge is selected as a result of the switching, purified water is discharged. When the flow path that does not pass through the water purification cartridge is selected as a result of the switching, raw water is discharged. The display portion 30 indicates whether discharge water is purified water or raw water.

By turning the handle 14 forward and rearward (by moving the handle 14 up and down), the lever position in the front-rear direction (hereinafter also referred to as "front-rear lever position") is changed. The amount of discharge water is adjusted by adjusting the front-rear lever position. In the present embodiment, the amount of discharge water increases as the handle 14 is moved upward. On the contrary, the mixer faucet 10 may be configured such that the amount of discharge water increases as the handle 14 is moved downward. By turning the handle 14 leftward and rightward, the lever position in the left-right direction (hereinafter referred to as "left-right lever position") is changed. Depending on the left-right lever position, the mixing ratio of hot water and cold water changes. The temperature of discharge water can be adjusted by turning the handle 14 leftward and rightward.

Figure 2:
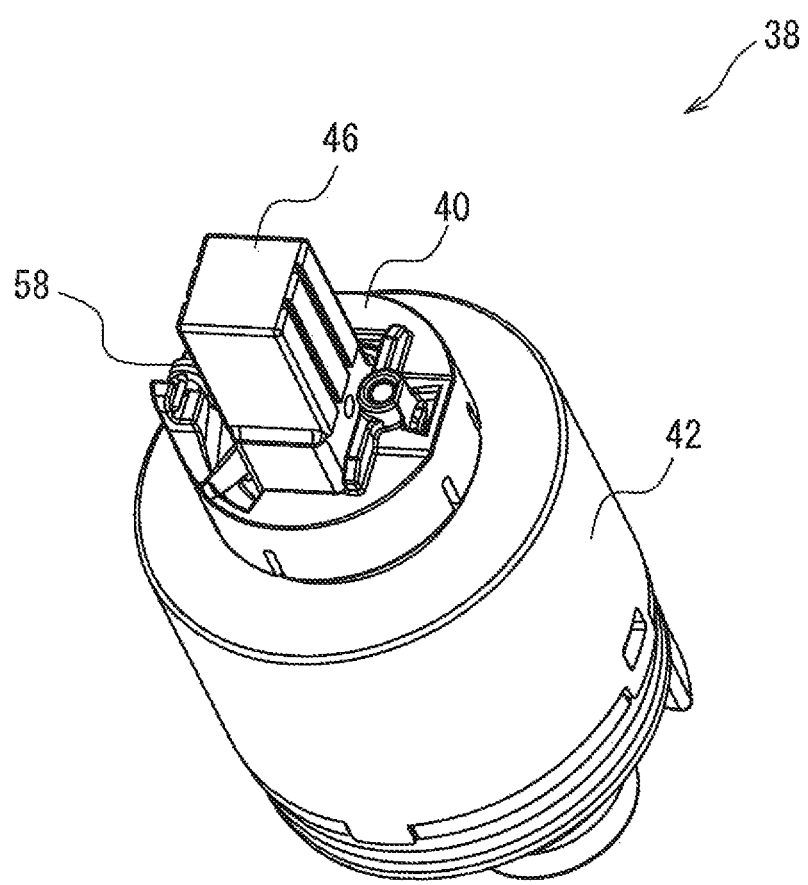
FIG. 2 is a perspective view of a lever assembly used in the mixer faucet shown in FIG. 1.
Figure 3:
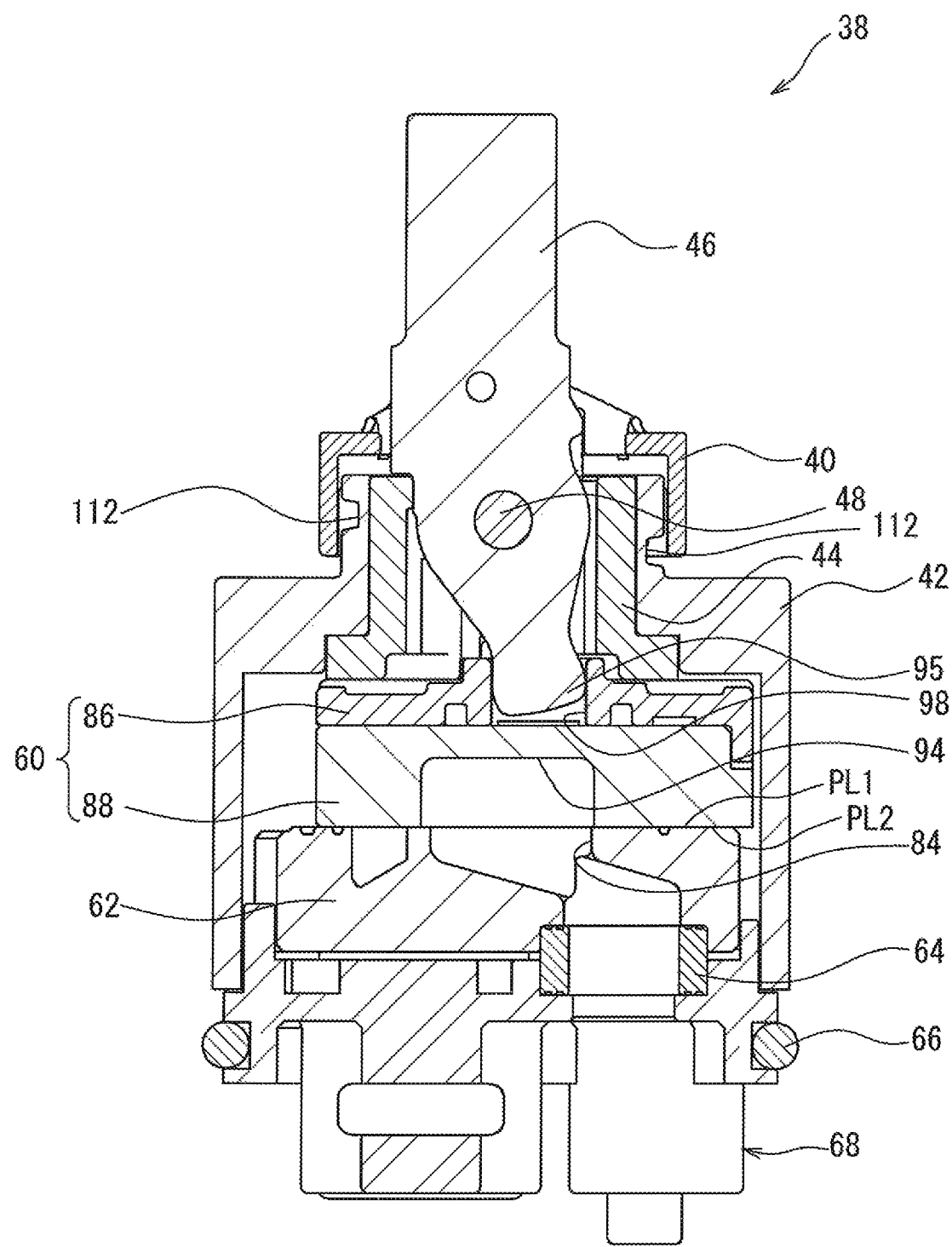
FIG. 3 is a cross-sectional view of the lever assembly shown in FIG. 2.
Figure 4:
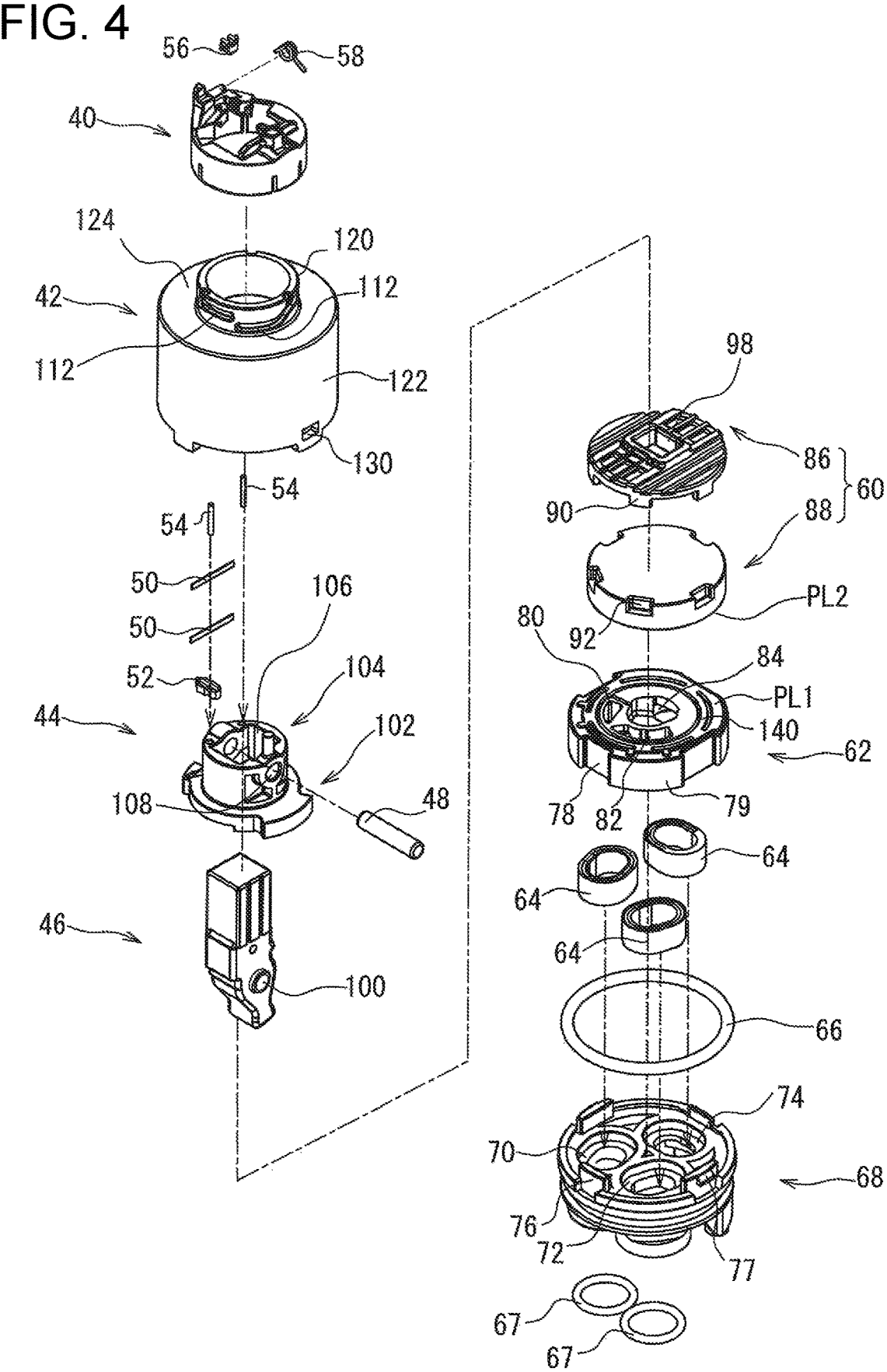
FIG. 4 is an exploded perspective view of the lever assembly shown in FIG. 2.

FIG. 2 is a perspective view of a lever assembly 38. FIG. 3 is a cross-sectional view of the lever assembly 38 taken perpendicular to a lever shaft. FIG. 4 is an exploded perspective view of the lever assembly 38. In the mixer faucet 10, the lever assembly 38 is replaceable.

The lever assembly 38 is accommodated in the main body 12 of the mixer faucet 10. As shown in FIGS. 3 and 4, the lever assembly 38 includes a movable body 40, a housing 42, a rotatable body 44, a lever 46, a lever shaft 48, left-right clicking elastic members 50, a left-right clicking abutment body 52, shafts 54, a front-rear clicking abutment body 56, a front-rear clicking elastic member 58, a movable valve body 60, a fixed valve body 62, packings 64, an O-ring 66, O-rings 67, and a base body 68. The handle 14 is fixed to the lever 46.

The front-rear clicking abutment body 56 and the front-rear clicking elastic member 58 are attached to the movable body 40. The front-rear clicking abutment body 56 abuts against a front-rear clicking engagement portion provided on a side surface of the lever 46 while being biased by the front-rear clicking elastic member 58 (torsion spring). The front-rear clicking engagement portion, which is not shown in the drawings, has recesses and protrusions. This abutment allows the user to feel clicking when the lever 46 is turned forward and rearward.

The left-right clicking abutment body 52 and the left-right clicking elastic members 50 are attached to the rotatable body 44. The left-right clicking abutment body 52 can abut against a left-right clicking engagement portion while being biased by the left-right clicking elastic members 50 (flat springs). The left-right clicking engagement portion, which is not shown in the drawings, is provided on the inner surface of the housing 42. The abutment between the abutment body 52 and the left-right clicking engagement portion allows the user to feel clicking when the lever 46 is turned leftward and rightward.

The base body 68 includes a hot water inlet port 70, a cold water inlet port 72, and a discharge port 74. In a lower portion of the base body 68, openings corresponding to the hot water inlet port 70, the cold water inlet port 72, and the discharge port 74 are provided, and the hot water inlet pipe 18, the cold water inlet pipe 20, and the discharge pipe 22 are connected to these openings.

The fixed valve body 62 is fixed to the upper side of the base body 68. The base body 68 is provided with an engagement protrusion 76 for fixing the fixed valve body 62 and an engagement protrusion 77 for fixing the housing 42.

The fixed valve body 62 is provided with an engagement recess 78 to be engaged with the engagement protrusion 76. The side surface of the fixed valve body 62 includes outer peripheral surfaces 79. The outer peripheral surfaces 79 are provided at a plurality of positions (four positions) in the circumferential direction. The outer peripheral surfaces 79 are circumferential surfaces.

The fixed valve body 62 includes a hot water supply hole 80, a cold water supply hole 82, and a drain hole 84. The hot water supply hole 80 penetrates through the fixed valve body 62. The hot water supply hole 80 is connected to the hot water inlet port 70 of the base body 68. The cold water supply hole 82 penetrates through the fixed valve body 62. The cold water supply hole 82 is connected to the cold water inlet port 72 of the base body 68. The drain hole 84 penetrates through the fixed valve body 62. The drain hole 84 is connected to the discharge port 74 of the base body 68.

In the fixed valve body 62, the supply holes 80 and 82 are disposed asymmetrically. When the left-right lever position is at the front position, only cold water is discharged. That is, a cold water discharge state is achieved when the left-right lever position is at the front position. This configuration contributes to saving of hot water, whereby the energy-saving performance is improved.

The movable valve body 60 includes an upper member 86 and a lower member 88. The upper member 86 is fixed to the lower member 88. The fixing is achieved through engagement between protrusions 90 and recesses 92. In the present embodiment, the upper member 86 and the lower member 88 are provided as separate members. When the upper member 86 and the lower member 88 are separate members, an optimum material and an optimal production method can be selected for each of the upper member 86 and the lower member 88. It is to be noted that the entire movable valve body 60 may be integrally formed as a single-piece member.

As shown in FIG. 3, a flow path forming recess 94 is formed on the lower surface of the movable valve body 60 (the lower member 88). The flow path forming recess 94 is open downward. The upper side of the flow path forming recess 94 is closed.

A flat smooth surface PL1 is provided on the upper surface of the fixed valve body 62 (see FIG. 4). The flat smooth surface PL1 is formed in a portion where the holes 80, 82, and 84 are not present. On the other hand, a flat smooth surface PL2 is provided on the lower surface of the lower member 88 (the movable valve body 60). The flat smooth surface PL2 is provided in a portion where the flow path forming recess 94 is not formed. The watertight state is ensured through the surface contact between the flat smooth surfaces PL1 and PL2.

The upper surface of the upper member 86 is provided with a lever engagement recess 98 to be engaged with a lower end 95 of the lever 46. The lower end 95 of the lever 46 is inserted into the lever engagement recess 98 (see FIG. 3). The movable valve body 60 slides on the fixed valve body 62 in conjunction with the movement of the lever 46 (the handle 14). The movable valve body 60 rotates as the handle 14 is turned leftward or rightward. The movable valve body 60 moves as the handle 14 is turned forward or rearward, and accordingly, the flow path forming recess 94 of the movable valve body 60 also moves.

When the flow path forming recess 94 overlaps the hot water supply hole 80 and/or the cold water supply hole 82 and also overlaps the drain hole 84, a water discharge state is achieved. The water discharge state encompasses a mixture discharge state, a hot water discharge state, and the cold water discharge state. When the flow path forming recess 94 overlaps the hot water supply hole 80 and the cold water supply hole 82, the mixture discharge state is achieved. In the mixture discharge state, hot water from the hot water supply hole 80 and cold water from the cold water supply hole 82 are mixed together. When the flow path forming recess 94 overlaps the hot water supply hole 80 only and does not overlap the cold water supply hole 82, the hot water discharge state is achieved. In the hot water discharge state, only hot water from the hot water supply hole 80 is discharged, and cold water from the cold water supply hole 82 is not discharged. When the flow path forming recess 94 overlaps the cold water supply hole 82 only and does not overlap the hot water supply hole 80, the cold water discharge state is achieved. In the cold water discharge state, only cold water from the cold water supply hole 82 is discharged, and hot water from the hot water supply hole 80 is not discharged. When the flow path forming recess 94 does not overlap either the hot water supply hole 80 or the cold water supply hole 82, a water shut-off state is achieved.

As shown in FIG. 4, the lever 46 includes a shaft hole 100. The lever shaft 48 is inserted into the shaft hole 100.

The rotatable body 44 includes a base portion 102 and an upper portion 104. The upper portion 104 includes a lever insertion hole 106 and a shaft hole 108. The base portion 102 is slidably attached to (the upper member 86 of) the movable valve body 60.

The lever 46 is inserted into the lever insertion hole 106, and the shaft hole 100 of the lever 46 and the shaft hole 108 of the rotatable body 44 are coaxially aligned. The lever shaft 48 is inserted into these shaft holes 100 and 108. The insertion of the lever shaft 48 allows the lever 46 to be fixed to the rotatable body 44 in such a manner that the lever 46 can be turned forward and rearward. The dimensions of the lever insertion hole 106 are set so as to allow forward and rearward turning of the lever 46. In the present application, turning of the lever 46 about the lever shaft 48 as the pivot axis and turning of the handle 14 accompanying the turning of the lever 46 are also referred to as "forward and rearward turning".

The movable body 40 is held by the rotatable body 44 in such a manner that the movable body 40 can be moved up and down. The movable body 40 can be moved only up and down with respect to the rotatable body 44, and cannot relatively rotate with respect to the rotatable body 44. The movable body 40 is configured such that it rotates together with the rotatable body 44 in conjunction with leftward and rightward turning of the handle 14 and can also move up and down in conjunction with this rotation. The up-and-down movement of the movable body 40 is achieved by a cam mechanism formed between the movable body 40 and the housing 42. On the inner surface of the movable body 40, an inner surface protrusion (not shown) is formed. The cam mechanism is effected by the engagement between the inner surface protrusion formed in the movable body 40 and a groove 112 (see FIGS. 3 and 4) provided in the housing 42. As shown in FIG. 4, the groove 112 extends curvedly. As the inner surface protrusion moves along the groove 112, the movable body 40 moves up and down while rotating. When the movable body 40 has moved to the upper side, the engagement involved in front-rear clicking (the engagement between the abutment body 56 and the front-rear clicking engagement portion 59) is released. When the movable body 40 has moved to the lower side, the engagement involved in the front-rear clicking is established.

The movable body 40 is held by the rotatable body 44 in such a manner that the movable body 44 cannot relatively rotate with respect to the rotatable body 44. The movable body 40 rotates together with the rotatable body 44. The handle 14, the lever 46, the movable body 40, and the rotatable body 44 rotate together.

As shown in FIG. 4, the housing 42 includes a smaller-diameter cylindrical portion 120, a larger-diameter cylindrical portion 122, and a coupling portion 124. The coupling portion 124 extends in the radial direction of the housing 42. The smaller-diameter cylindrical portion 120 includes an upper opening. The larger-diameter cylindrical portion 122 includes a lower opening. The above-described groove 112 is provided on the outer circumferential surface of the smaller-diameter cylindrical portion 120.

The larger-diameter cylindrical portion 122 includes an engagement hole 130. The engagement hole 130 is engaged with the engagement protrusion 77 of the base body 68. Through this engagement, the housing 42 is fixed to the base body 68.

The outer diameter of the circumferential surface portion of the upper portion 104 of the rotatable body 44 is substantially equal to the inner diameter of the smaller-diameter cylindrical portion 120. The upper portion 104 of the rotatable body 44 is rotatably held in the smaller-diameter cylindrical portion 120. During rotation of the upper portion 104, the outer circumferential surface of the upper portion 104 and the inner circumferential surface of the smaller-diameter cylindrical portion 120 slide with each other. The larger-diameter cylindrical portion 122 houses the base portion 102 of the rotatable body 44, the movable valve body 60, and the fixed valve body 62.

Figure 5:
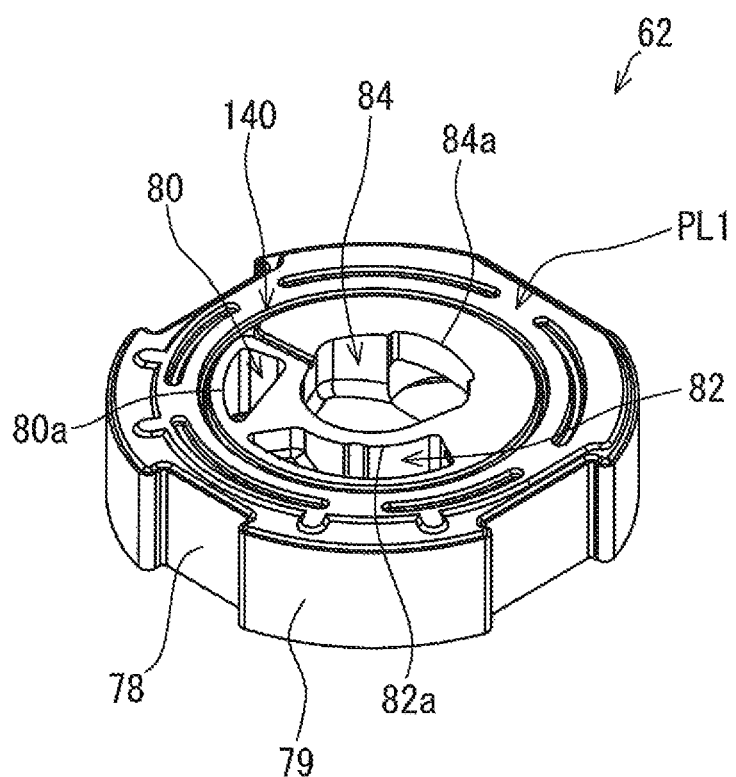
FIG. 5 is a perspective view of a fixed valve body according to the first embodiment.
Figure 6:
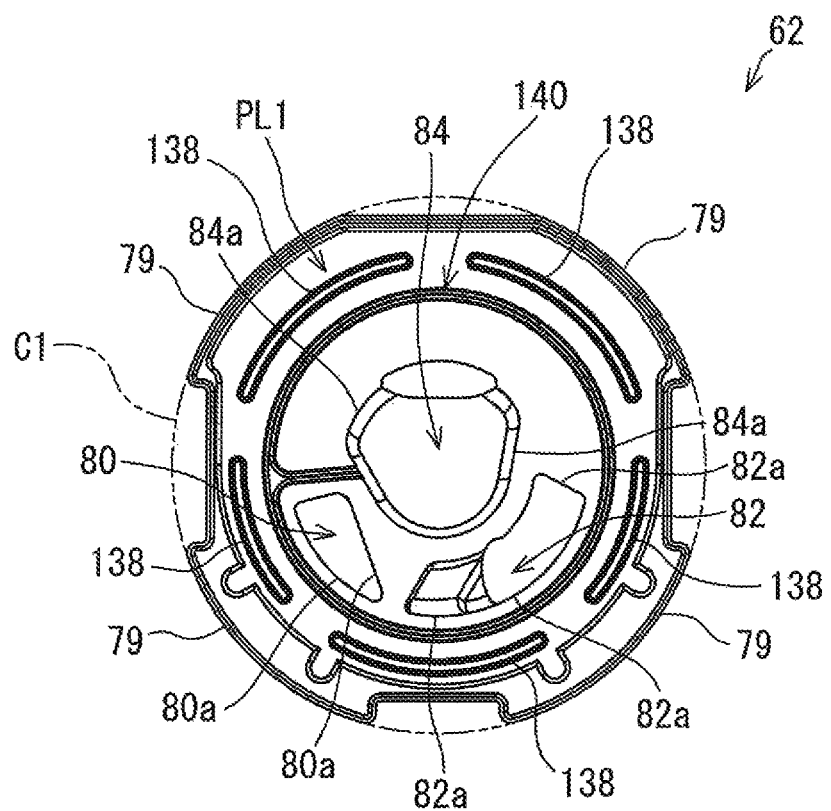
FIG. 6 is a plan view of the fixed valve body shown in FIG. 5.
Figure 7:
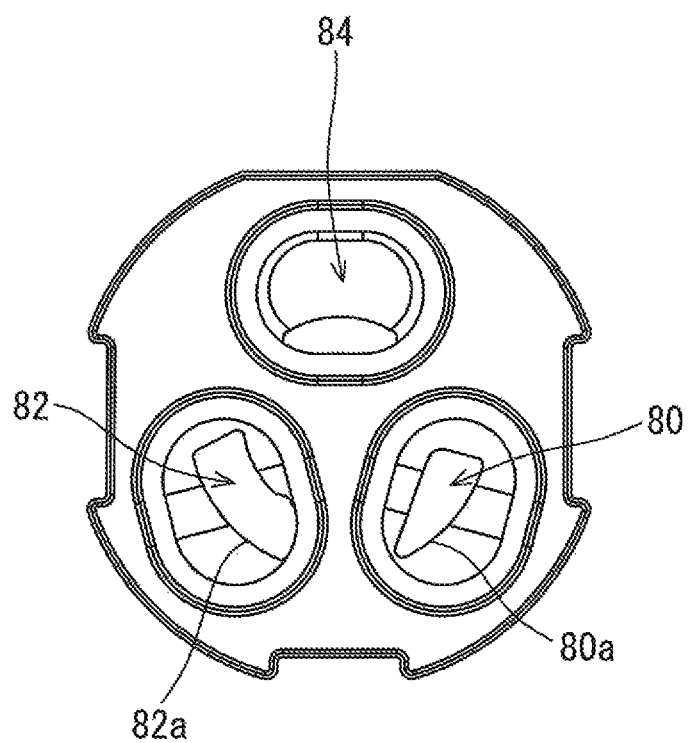
FIG. 7 is a bottom view of the fixed valve body shown in FIG. 5.

FIG. 5 is a perspective view of the fixed valve body 62. FIG. 6 is a plan view of the fixed valve body 62 as viewed from above. FIG. 7 is a bottom view of the fixed valve body 62 as viewed from below.

As described above, the fixed valve body 62 includes the hot water supply hole 80, the cold water supply hole 82, and the drain hole 84.

The hot water supply hole 80 includes an upper opening line 80a. The upper opening line 80a is the outline of the hot water supply hole 80 on the flat smooth surface PL1. The upper opening line 80a is the outline of the upper opening of the hot water supply hole 80.

The cold water supply hole 82 includes an upper opening line 82a. The upper opening line 82a is the outline of the cold water supply hole 82 on the flat smooth surface PL1. The upper opening line 82a is the outline of the upper opening of the cold water supply hole 82.

The drain hole 84 includes an upper opening line 84a. The upper opening line 84a is the outline of the drain hole 84 on the flat smooth surface PL1. The upper opening line 84a is the outline of the upper opening of the drain hole 84.

As shown in FIG. 6, the upper opening line 80a and the upper opening line 82a are not in a line-symmetric relationship. That is, the upper opening of the hot water supply hole 80 and the upper opening of the cold water supply hole 82 are not in a line-symmetric relationship. It is to be noted that they may be in a line-symmetric relationship. The area of a region surrounded by the upper opening line 80a is smaller than the area of a region surrounded by the upper opening line 82a. That is, the area of the upper opening of the hot water supply hole 80 is smaller than the area of the upper opening of the cold water supply hole 82. It is to be noted that the areas of these upper openings may be the same.

As shown in FIGS. 5 and 6, the fixed valve body 62 includes grease retention portions 138 and a collection groove 140.

The grease retention portions 138 are provided on the flat smooth surface PL1. The grease retention portions 138 are provided radially outside with respect to the collection groove 140. The grease retention portions 138 are grooves that are open upward. The grease retention portions 138 are grooves. The grease retention portions 138 are disposed spaced apart from each other in the circumferential direction. The grease retention portions 138 contain grease. Every time the mixer faucet 10 is used, a small amount of grease is supplied between the movable valve body 60 and the fixed valve body 62. The grease can improve the slidability and the watertightness.

The collection groove 140 is provided on the upper surface of the fixed valve body 62. The collection groove 140 is provided on the flat smooth surface PL1. The collection groove 140 is a groove that is open upward.

In FIG. 6, the two-dot chain line indicates the smallest enclosing circle C1 of the fixed valve body 62. In the present application, the smallest enclosing circle C1 is defined as follows. The smallest enclosing circle C1 is defined as, among circles that include the entire fixed valve body 62 inside them, one having the smallest radius. The smallest enclosing circle C1 is determined with reference to a plan view like the one shown in FIG. 6. The plan view of FIG. 6 shows a projection drawing obtained by the projection of the fixed valve body 62 onto a plane parallel to the flat smooth surface PL1. In the present embodiment, the radius of the smallest enclosing circle C1 is equal to the radius of the circumferential surface that includes the outer peripheral surfaces 79. In the present application, the radial direction refers to the radial direction of this smallest enclosing circle C1. In the present application, the circumferential direction refers to the circumferential direction of this smallest enclosing circle C1.

Figure 8:
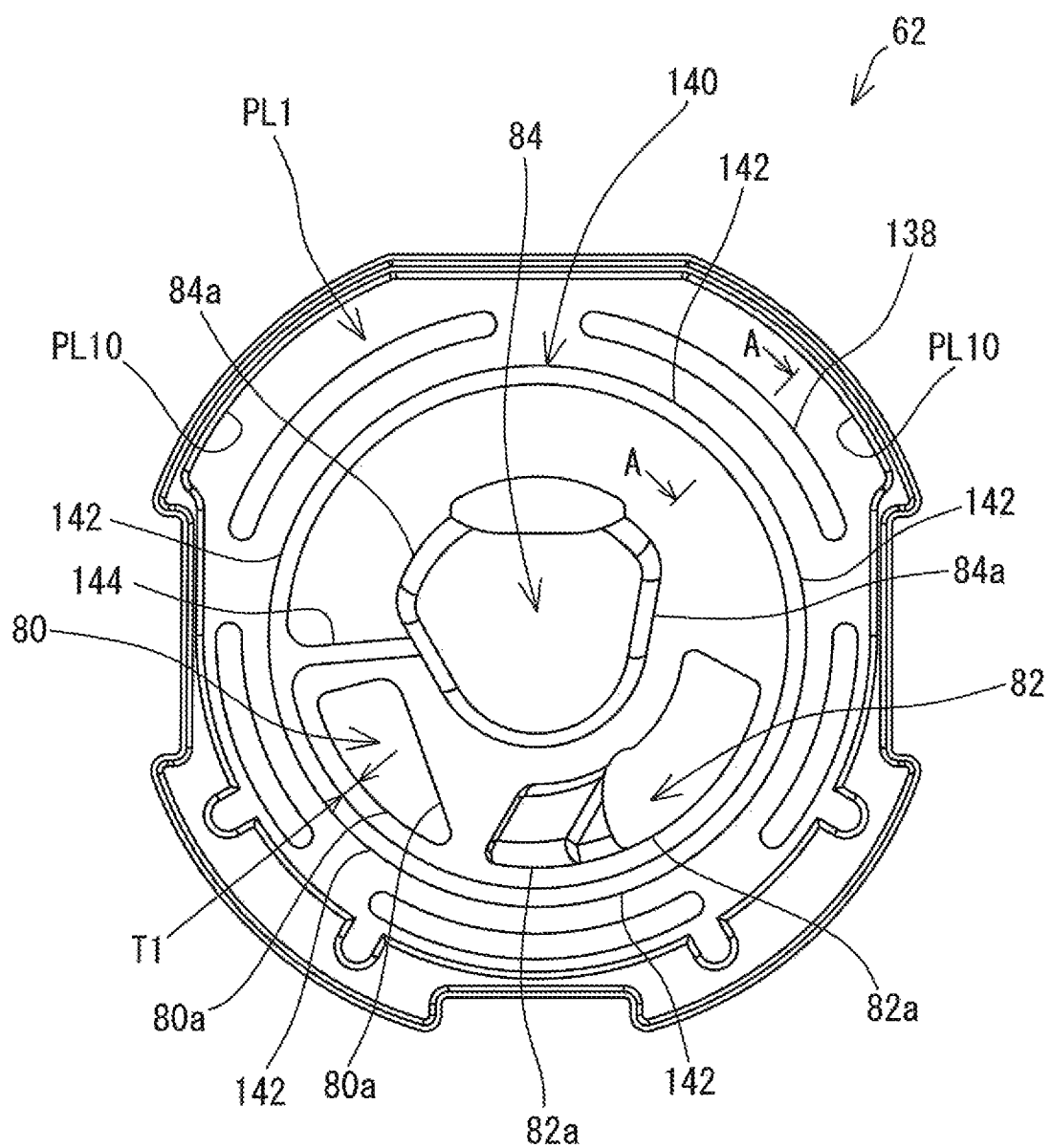
FIG. 8 is an enlarged view of FIG. 6.
Figure 9:
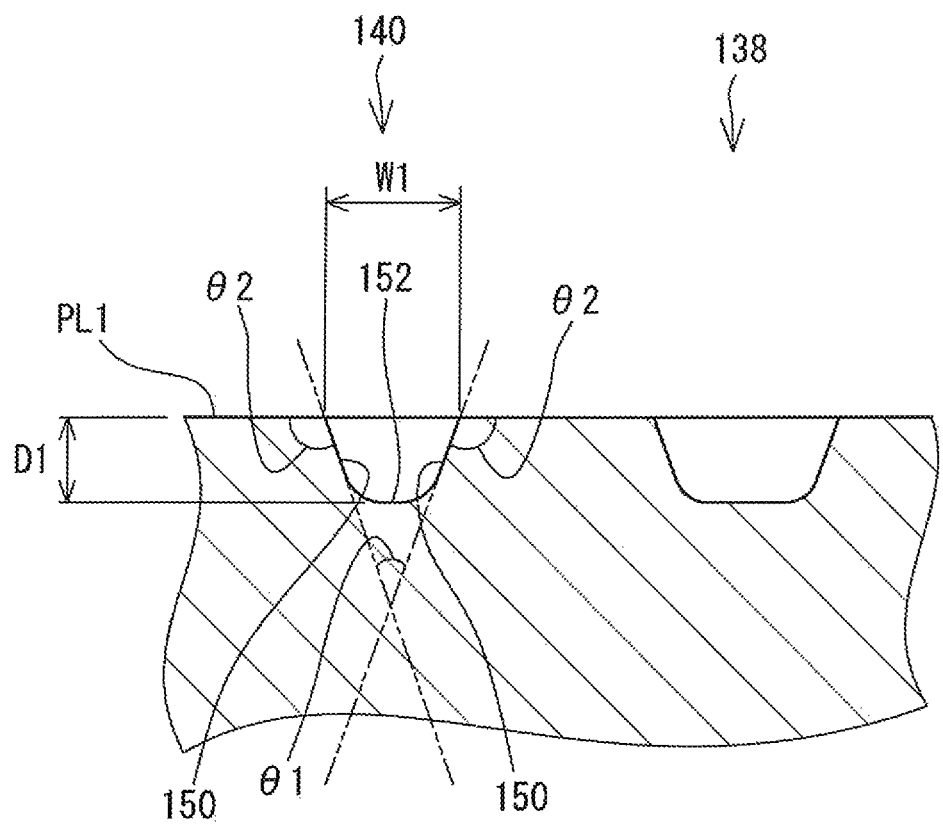
FIG. 9 is a cross-sectional view taken along line A-A in FIG. 8.

FIG. 8 is an enlarged view of the plan view of FIG. 6. FIG. 9 is a cross-sectional view taken along line A-A in FIG. 8. The cross-sectional view of FIG. 9 is taken in a direction perpendicular to the extending direction of the collection groove 140. The cross-sectional view of FIG. 9 is taken in the radial direction. As described above, the fixed valve body 62 includes the collection groove 140. The fixed valve body 62 also includes the grease retention portions 138. The grease retention portions 138 are located radially outside with respect to the collection groove 140. The grease retention portions 138 extend along the collection groove 140 (a surrounding portion 142 to be described below). The grease retention portions 138 each extend in an arc shape. The grease retention portions 138 are grooves. It is to be noted that the grease retention portions 138 may be recesses that are not grooves.

The collection groove 140 is not connected to the hot water supply hole 80. The collection groove 140 is not connected to the cold water supply hole 82. The collection groove 140 is connected to the drain hole 84. The collection groove 140 is not connected to an outer edge PL10 of the flat smooth surface PL1. The collection groove 140 is not connected to the grease retention portions 138. The collection groove 140 is connected only to the drain hole 84. The collection groove 140 is not connected to anything other than the drain hole 84. The collection groove 140 excluding a portion connected to the drain hole 84 is surrounded by the flat smooth surface PL1.

In the present embodiment, the collection groove 140 is connected at a single position to the drain hole 84. It is to be noted that the collection groove 140 may be connected at two or more positions to the drain hole 84. For example, one end and the other end of the collection groove 140 may be connected to the drain hole 84.

The collection groove 140 functions as a water flow path. The collection groove 140, which is open upward, is closed from above with the flat smooth surface PL2 of the movable valve body 60. Over the entire movable range of the movable valve body 60, the entire collection groove 140 is closed from above with the flat smooth surface PL2. Accordingly, water in the collection groove 140 flows into the drain hole 84 through the collection groove 140.

The collection groove 140 is located radially outside with respect to the hot water supply hole 80. The collection groove 140 is located radially outside with respect to the cold water supply hole 82. The collection groove 140 is located radially outside with respect to the drain hole 84.

The collection groove 140 includes the surrounding portion 142 and a connection portion 144.

The surrounding portion 142 surrounds the hot water supply hole 80, the cold water supply hole 82, and the drain hole 84. In other words, the hot water supply hole 80, the cold water supply hole 82, and the drain hole 84 are located radially inside with respect to the surrounding portion 142.

The surrounding portion 142 is disposed continuously and wholly in the circumferential direction. That is, the surrounding portion 142 extends continuously 360° in the circumferential direction. The surrounding portion 142 is continuous over 360° in the circumferential direction. The surrounding portion 142 is circular. The surrounding portion 142 extends along the circumferential direction.

The connection portion 144 connects the surrounding portion 142 and the drain hole 84. The connection portion 144 connects a single position of the surrounding portion 142 to the drain hole 84. The surrounding portion 142 is connected only to the drain hole 84.

In the water discharge state, the flow path forming recess 94 does not overlap the surrounding portion 142 over the entire movable range of the flow path forming recess 94. In other words, in the water discharge state, when the lever is at any position in the front-rear direction and the left-right direction, the flow path forming recess 94 does not overlap the surrounding portion 142.

The movable range of the flow path forming recess 94 includes positions where the flow path forming recess 94 overlaps the connection portion 144. In the hot water discharge state, the flow path forming recess 94 overlaps the connection portion 144. In the mixture discharge state, the flow path forming recess 94 does not overlap the connection portion 144. In the cold water discharge state, the flow path forming recess 94 does not overlap the connection portion 144.

FIG. 9 is a cross-sectional view taken along line A-A in FIG. 8. The cross-sectional view of FIG. 9 is taken in a direction perpendicular to the extending direction of the collection groove 140. In the collection groove 140, two side surfaces 150 and a bottom surface 152 are smoothly connected to each other. The bottom surface 152 is a curved surface that protrudes downward. In FIG. 9, $\theta 1$ represents the angle formed between the side surfaces 150, and $\theta 2$ represents the angle formed between each side surface 150 and the flat smooth surface PL1.

Advantageous Effects

The fixed valve body 62 includes the collection groove 140. The collection groove 140 can effectively suppress the occurrence of the above-described water leakage. The water leakage occurs when water leaks from the normal route and enters between the flat smooth surfaces PL1 and PL2. The collection groove 140 captures the leaking water that has entered between the flat smooth surfaces PL1 and PL2 before it reaches the outer edge PL10 of the flat smooth surface PL1. The water captured by the collection groove 140 flows into the drain hole 84. Thus, leakage of water radially outward of the fixed valve body 62 is suppressed.

The collection groove 140 includes a portion located radially outward of the hot water supply hole 80. This allows water leaking from the hot water supply hole 80 to be effectively captured by the collection groove 140.

The collection groove 140 includes a portion located radially outward of the cold water supply hole 82. This allows water leaking from the cold water supply hole 82 to be effectively captured by the collection groove 140.

The collection groove 140 includes a portion located radially outward of the drain hole 84. This allows water leaking from the drain hole 84 to be effectively captured by the collection groove 140.

In general, the water pressure in the cold water supply hole 82 is higher than that in the hot water supply hole 80 to which water heated by passing through a water heater is supplied. From this viewpoint, the collection groove 140 preferably includes a portion located radially outward of the cold water supply hole 82. In the water cut-off state, the hot water supply hole 80 and the cold water supply hole 82 are blocked, and the water pressures in these supply holes 80 and 82 thus increase. From this viewpoint, the collection groove 140 preferably includes a portion located radially outward of the hot water supply hole 80 and a portion located radially outward of the cold water supply hole 82. From the viewpoint of the leaking water capturing performance, it is more preferable that the collection groove 140 be located radially outward of the hot water supply hole 80, radially outward of the cold water supply hole 82, and radially outward of the drain hole 84. In the present application, the leaking water capturing performance is also referred to simply as capturing performance.

The collection groove 140 may be interrupted at one or more positions in the circumferential direction. A plurality of collection grooves 140 may be provided. In this case, it is preferable that all the collection grooves be connected to the drain hole 84. For example, as the collection grooves, a first collection groove that is located radially outward of the hot water supply hole 80 and is connected to the drain hole 84, a second collection groove that is located radially outward of the cold water supply hole 82 and is connected to the drain hole 84, and a third collection groove that is located radially outward of the drain hole 84 and is connected to the drain hole 84 may be provided.

From the viewpoint of the capturing performance, it is more preferable that the collection groove 140 extend continuously and wholly in the circumferential direction. In other words, it is more preferable that the collection groove 140 extend continuously 360° in the circumferential direction.

Also from the viewpoint of allowing the captured leaking water to easily flow into the drain hole 84, it is more preferable that the collection groove 140 extend continuously and wholly in the circumferential direction. In this case, the captured water can reach the drain hole 84 either through a clockwise route or a counterclockwise route. In the present application, the characteristics that allow captured leaking water to flow through the collection groove 140 to reach the drain hole 84 are also referred to as recirculating characteristics.

The collection groove 140 includes: the surrounding portion 142 that surrounds the hot water supply hole 80, the cold water supply hole 82, and the drain hole 84; and the connection portion 144 that connects the surrounding portion 142 and the drain hole 84. By providing the surrounding portion 142 and the connecting portion 144, the degree of freedom in the shape of the surrounding portion 142 is increased. This allows the collection groove 140 to be effectively disposed in the fixed valve body 62 in which the hot water supply hole 80, the cold water supply hole 82, and the drain hole 84 are disposed in a limited area. In addition, the surrounding portion 142 can be easily formed into a shape close to a circle, whereby the capturing performance and the recirculating characteristics can be improved. In the present embodiment, the surrounding portion 142 is circular. The circular surrounding portion 142 allows water to flow smoothly, thereby contributing to the improvement of the recirculating characteristics.

The connecting portion 144 extends straight. The straight extending connecting portion 144 allows water to flow smoothly, thereby contributing to the improvement of the recirculating characteristics. Alternatively, the connection portion 144 may be curved.

Figure 10:
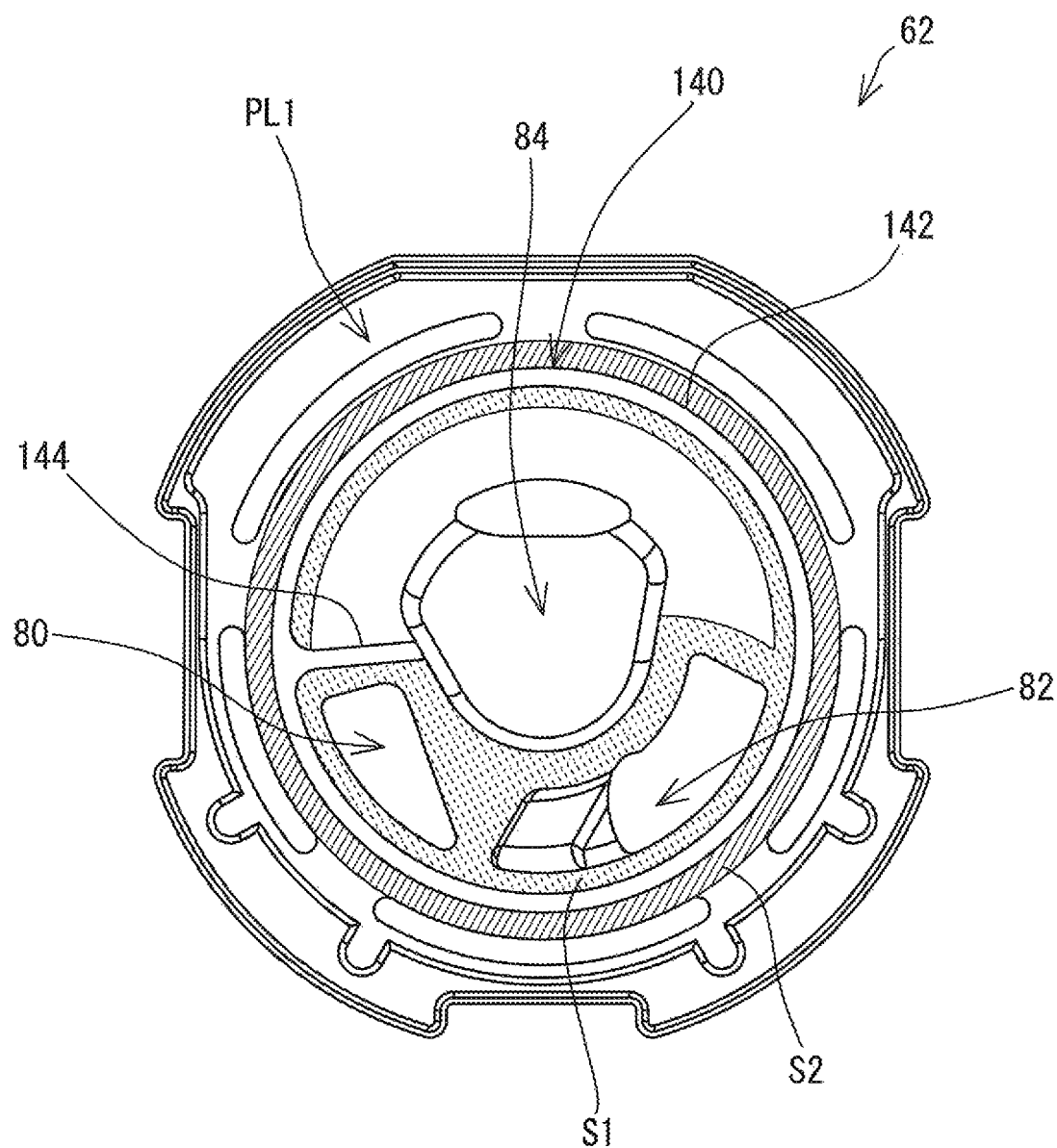
FIG. 10 shows the same enlarged view as FIG. 8.

FIG. 10 shows the same plan view as FIG. 8. FIG. 10 is provided separately from FIG. 8 to avoid the presence of too many reference numerals in a single drawing for the sake of clarity.

The flat smooth surface PL1 of the fixed valve body 62 includes a first sealing surface S1 and a second sealing surface S2. The first sealing surface S1 is a region located radially inside with respect to the surrounding portion 142. The first sealing surface S1 includes a region around the hot water supply hole 80 and a region around the cold water supply hole 82. The second sealing surface S2 is a region located radially outside with respect to the surrounding portion 142. In FIG. 10, the first sealing surface S1 is indicated by hatching with dashed lines, and the second sealing surface S2 is indicated by hatching with solid lines.

When the water pressure on the primary side (the pressure of water supplied from waterworks) becomes too high, leaking water can break through the first sealing surface S1. However, since the collection groove 140 is connected to the drain hole 84, this water pressure can be released effectively. As a result, the second sealing surface S2 is subjected to the reduced water pressure, whereby the risk of water leakage from between the movable valve body 60 and the fixed valve body 62 is further reduced.

The collection groove 140 can also function as a grease reservoir. Grease contained in the collection groove 140 can be gradually released therefrom. Further, even if the grease is present in the collection groove 140, water in the collection groove 140 can flow into the drain hole 84 owing to the water pressure.

In the present embodiment, one connection portion 144 is provided. The connection portion 144 connects a single position of the surrounding portion 142 to the drain hole 84. It is to be noted that two or more connection portions 144 may be provided. For example, a first connection portion 144 that connects a first position in the surrounding portion 142 to the drain hole 84 and a second connection portion 144 that connects a second position in the surrounding portion 142 to the drain hole 84 may be provided. In this case, the position of the first position in the circumferential direction may be different from the position of the second position in the circumferential direction. The connection portion 144 makes a smaller contribution to the capturing performance than the surrounding portion 142 does. Considering this fact, the number of the connection portion(s) 144 is preferably one. When the surrounding portion 142 extends continuously and wholly in the circumferential direction, water captured from the entire region in the circumferential direction can be led to the drain hole 84 using one connecting portion 144.

Figure 11:
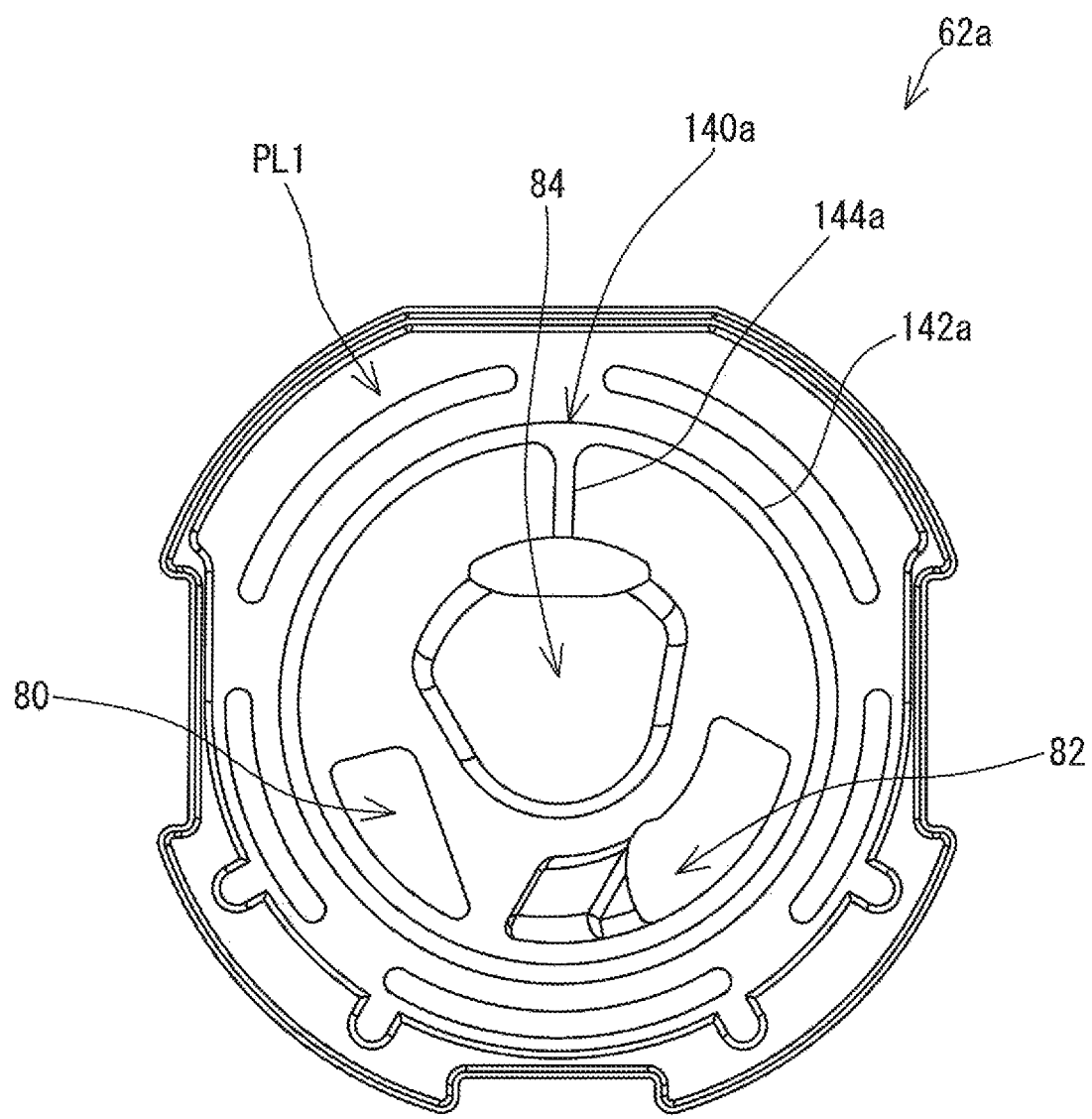
FIG. 11 is a plan view of a fixed valve body according to a second embodiment.

FIG. 11 is a plan view showing a fixed valve body 62a according to a second embodiment. The fixed valve body 62a has the same configuration as the fixed valve body 62 of the first embodiment, except that the position of a connection portion therein is different from that of the connection portion in the fixed valve body 62.

The fixed valve body 62a includes a surrounding portion 142a and a connection portion 144a. The surrounding portion 142a has the same configuration as the surrounding portion 142 of the first embodiment. In the fixed valve body 62, the connection portion 144 is located near the hot water supply hole 80. In contrast, in the fixed valve body 62a, the connection portion 144a is located at a position farther apart from a hot water supply hole 80 and also from a cold water supply hole 82.

The surrounding portion 142a surrounds the hot water supply hole 80, the cold water supply hole 82, and a drain hole 84. In other words, the hot water supply hole 80, the cold water supply hole 82, and the drain hole 84 are located radially inside with respect to the surrounding portion 142a. The surrounding portion 142a is disposed continuously and wholly in the circumferential direction.

The connection portion 144a connects the surrounding portion 142a and the drain hole 84. The connection portion 144a connects a single position of the surrounding portion 142a to the drain hole 84.

In the water discharge state, over the entire movable range of a flow path forming recess 94, the flow path forming recess 94 does not overlap the surrounding portion 142a. In other words, in the water discharge state, when the lever is at any position in the front-rear direction and the left-right direction, the flow path forming recess 94 does not overlap the surrounding portion 142a.

In the water discharge state, the movable range of the flow path forming recess 94 does not include positions where the flow path forming recess 94 overlaps the connection portion 144a. In the water discharge state, over the entire movable range of the flow path forming recess 94, the flow path forming recess 94 does not overlap the connection portion 144a. In other words, in the water discharge state, when the lever is at any position in the front-rear direction and the left-right direction, the flow path forming recess 94 does not overlap the connection portion 144a. In the hot water discharge state, the flow path forming recess 94 does not overlap the connection portion 144a. In the mixture discharge state, the flow path forming recess 94 does not overlap the connection portion 144a. In the cold water discharge state, the flow path forming recess 94 does not overlap the connection portion 144a.

In the water discharge state, the movable range of the flow path forming recess 94 does not include positions where the flow path forming recess 94 overlaps a collection groove 140a. Over the entire movable range of the flow path forming recess 94, the flow path forming recess 94 does not overlap the collection groove 140a. In other words, in the water discharge state, when the lever is at any position in the front-rear direction and the left-right direction, the flow path forming recess 94 does not overlap the collection groove 140a. In the hot water discharge state, the flow path forming recess 94 does not overlap the collection groove 140a. In the mixture discharge state, the flow path forming recess 94 does not overlap the collection groove 140a. In the cold water discharge state, the flow path forming recess 94 does not overlap the collection groove 140a.

Figure 12:
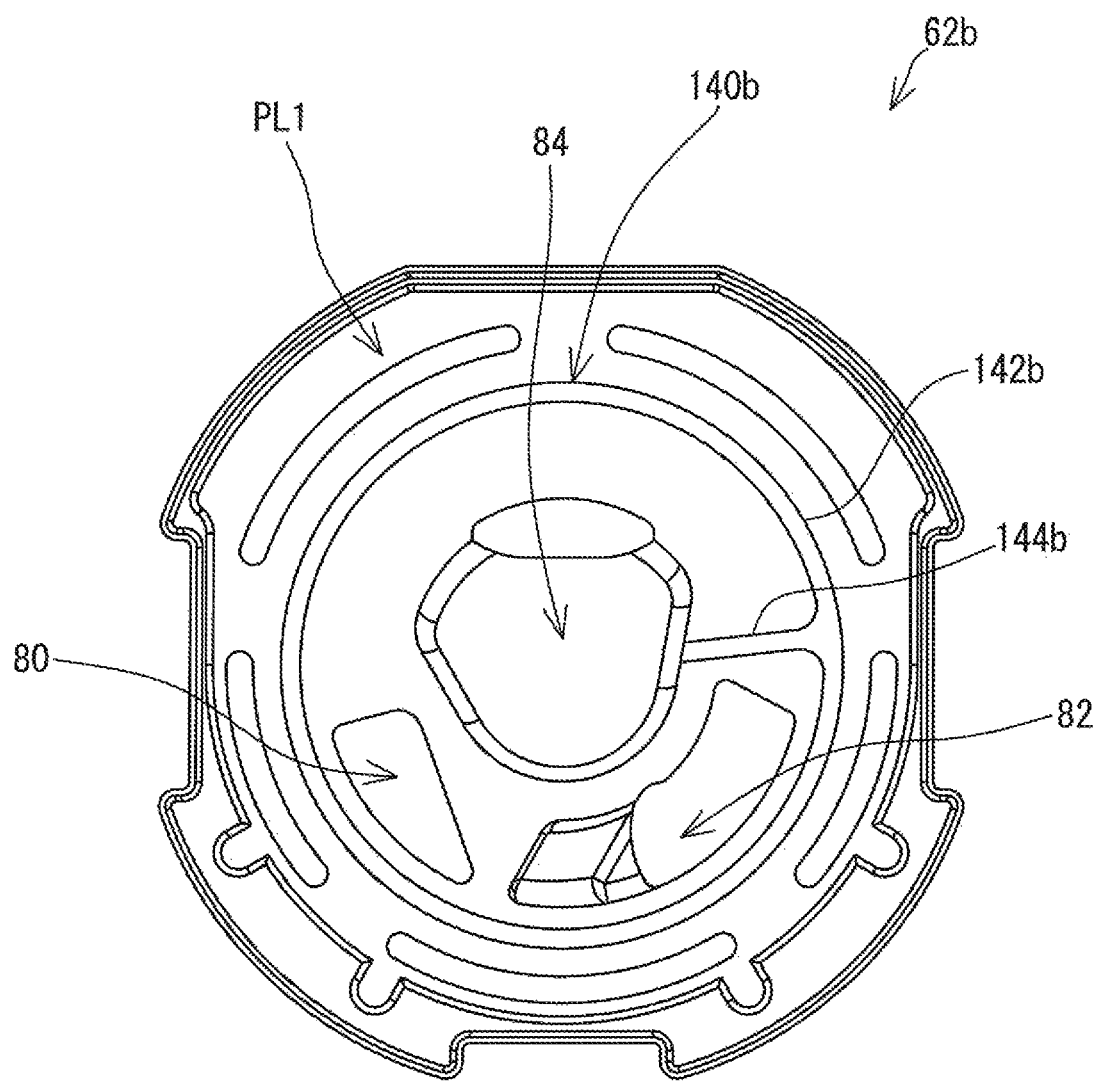
FIG. 12 is a plan view of a fixed valve body according to a third embodiment.

FIG. 12 is a plan view showing a fixed valve body 62b according to the third embodiment. The fixed valve body 62b has the same configuration as the fixed valve body 62 of the first embodiment, except that the position of a connection portion therein is different from that of the connection portion in the fixed valve body 62.

A collection groove 140b of the fixed valve body 62b includes a surrounding portion 142b and a connection portion 144b. The surrounding portion 142b has the same configuration as the surrounding portion 142 of the first embodiment. In the fixed valve body 62, the connection portion 144 is located near the hot water supply hole 80. In contrast, in the fixed valve body 62b, the connection portion 144b is located near a cold water supply hole 82.

The surrounding portion 142b surrounds a hot water supply hole 80, the cold water supply hole 82, and a drain hole 84. In other words, the hot water supply hole 80, the cold water supply hole 82, and the drain hole 84 are located radially inside with respect to the surrounding portion 142b. The surrounding portion 142b is disposed continuously and wholly in the circumferential direction.

The connection portion 144b connects the surrounding portion 142b and the drain hole 84. The connection portion 144b connects a single position of the surrounding portion 142b to the drain hole 84.

In the water discharge state, over the entire movable range of a flow path forming recess 94, the flow path forming recess 94 does not overlap the surrounding portion 142b. In other words, in the water discharge state, when the lever is at any position in the front-rear direction and the left-right direction, the flow path forming recess 94 does not overlap the surrounding portion 142b.

The movable range of the flow path forming recess 94 includes positions where the flow path forming recess 94 overlaps the connection portion 144b. In the hot water discharge state, the flow path forming recess 94 does not overlap the connection portion 144b. In the mixture discharge state, the flow path forming recess 94 does not overlap the connection portion 144b. In the cold water discharge state, the flow path forming recess 94 overlaps the connection portion 144b.

Figure 13:
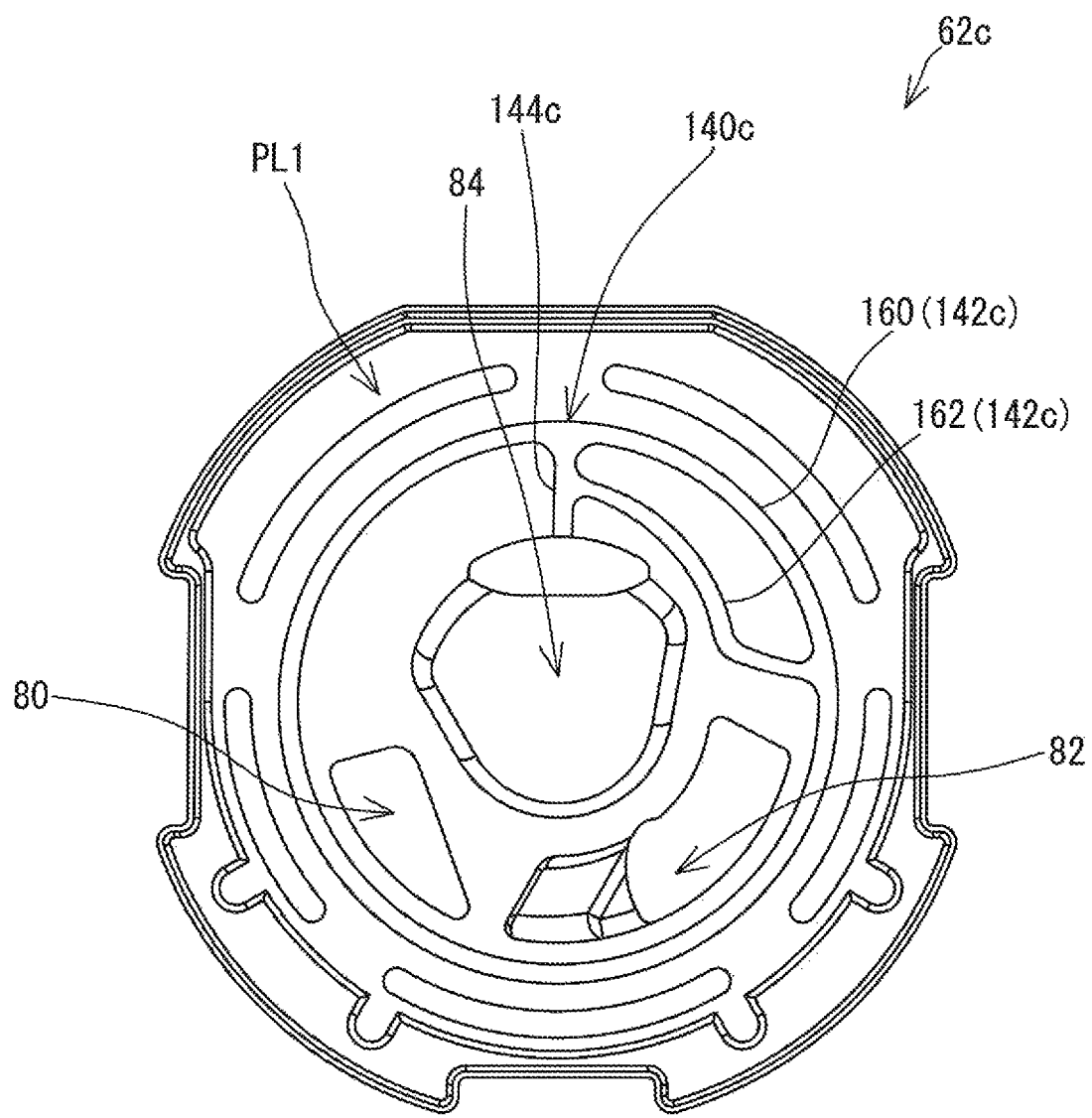
FIG. 13 is a plan view of a fixed valve body according to a fourth embodiment.

FIG. 13 is a plan view showing a fixed valve body 62c according to the fourth embodiment. The fixed valve body 62c includes a collection groove 140c. The collection groove 140c includes a surrounding portion 142c and a connection portion 144c. The surrounding portion 142c includes a circular portion 160 and a non-circular portion 162. One end of the non-circular portion 162 branches off from the connecting portion 144c. The other end of the non-circular portion 162 branches off from the circular portion 160.

Figure 14:
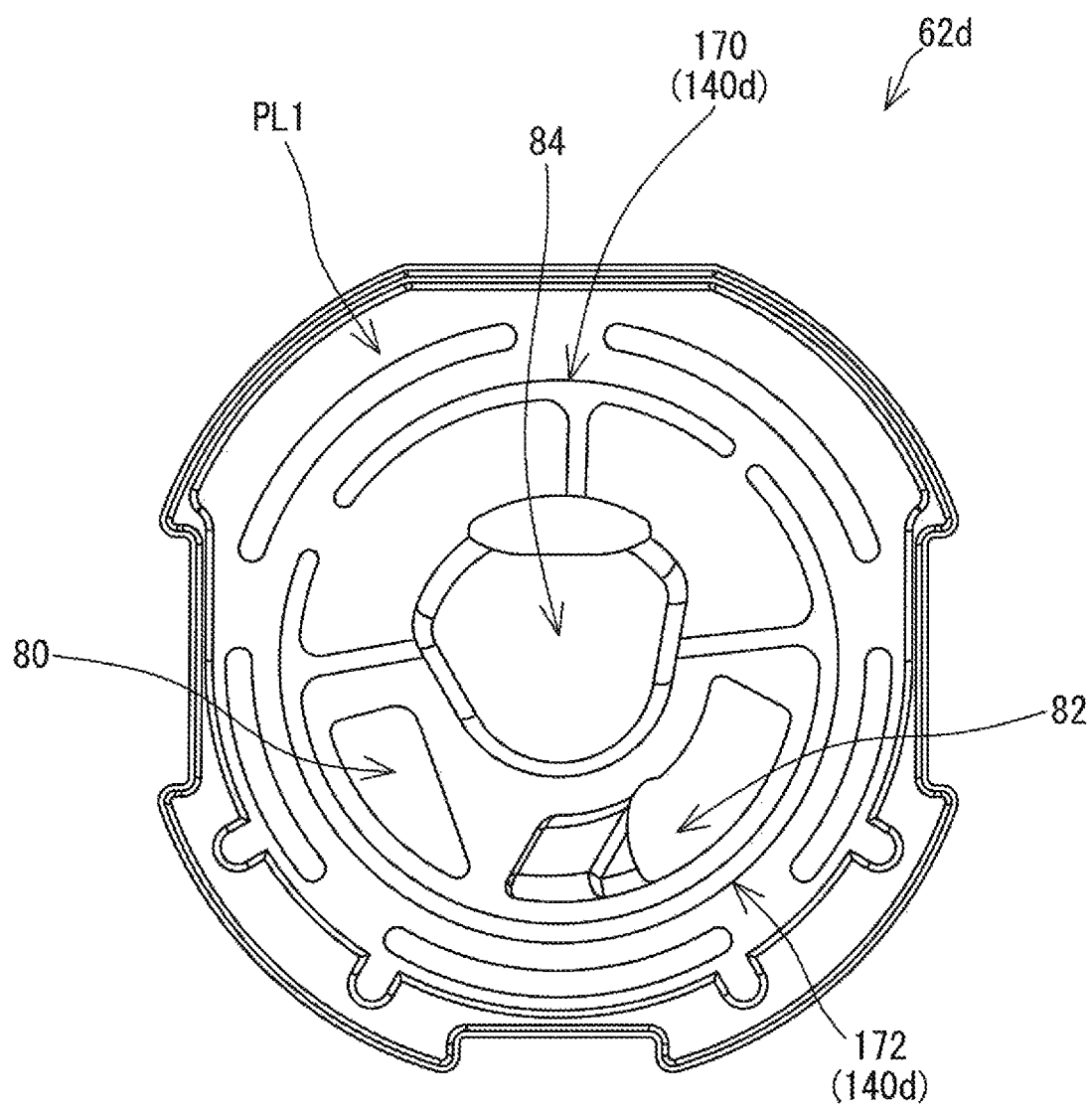
FIG. 14 is a plan view of a fixed valve body according to a fifth embodiment.

FIG. 14 is a plan view showing a fixed valve body 62d according to the fifth embodiment. The fixed valve body 62d includes collection grooves 140d. The collection grooves 140d includes a first collection groove 170 and a second collection groove 172. The first collection groove 170 and the second collection groove 172 are not connected to each other. The first collection groove 170 is connected to a drain hole 84. The second collection groove 172 is connected to the drain hole 84. The first collection groove 170 is connected at a single position to the drain hole 84. The second collection groove 172 is connected at two positions to the drain hole 84.

There is no limitation on the number of collection grooves. The number of collection groove(s) may be one. Alternatively, the number of collection grooves may be two or more. The embodiment shown in FIG. 14 is an example where two or more collection grooves are provided.

The collection groove may include a branched portion. The non-circular portion 162 in the embodiment shown in FIG. 13 is an example of the branch portion.

The collection groove may be interrupted at an intermediate position(s). The collection groove does not have to extend continuously throughout the circumferential direction. A plurality of collection grooves that are not connected to each other may be provided. The embodiment shown in FIG. 14 discloses two collection grooves that are not connected to each other (the first collection groove 170, the second collection groove 172). The plurality of collection grooves that are not connected to each other are each connected to the drain hole 84.

There is no limitation on the shape of the collection groove (the shape of the collection groove in a plan view of the fixed valve body). The collection groove (surrounding portion) does not have to be circular. The non-circular portion 162 in FIG. 13 is an example of a non-circular collection groove. The non-circular portion 162 in FIG. 13 is an example of a non-circular surrounding portion.

The width of the collection groove may or may not be constant. The width of the collection groove may vary.

The following configurations A and B are applicable to the overlapping between the collection groove and the flow path forming recess 94.

[Configuration A]: The movable range of the flow path forming recess 94 in the water discharge state includes positions where the flow path forming recess 94 overlaps the collection groove. That is, in the water discharge state, the flow path forming recess 94 overlaps the collection groove.

[Configuration B]: The movable range of the flow path forming recess 94 in the water discharge state does not include positions where the flow path forming recess 94 overlaps the collection groove. That is, in the water discharge state, the flow path forming recess 94 does not overlap the collection groove.

When the flow path forming recess 94 overlaps the collection groove in the water discharge state, water from the hot water supply hole 80 or the cold water supply hole 82 can flow into the collection groove. The water that has flown into the collection groove flows into the drain hole 84, and thus does not cause water leakage. However, if water other than leaking water flows into the collection groove, the capturing performance and the recirculating characteristics may be deteriorated. From this viewpoint, the configuration B is preferable.

The following configurations C and D are applicable to the overlapping between the surrounding portion and the flow path forming recess 94.

[Configuration C]: The movable range of the flow path forming recess 94 in the water discharge state includes positions where the flow path forming recess 94 overlaps the surrounding portion. That is, in the water discharge state, the flow path forming recess 94 overlaps the surrounding portion.

[Configuration D]: The movable range of the flow path forming recess 94 in the water discharge state does not include positions where the flow path forming recess 94 overlaps the surrounding portion. That is, in the water discharge state, the flow path forming recess 94 does not overlap the surrounding portion.

When the flow path forming recess 94 overlaps the surrounding portion in the water discharge state, water from the hot water supply hole 80 or the cold water supply hole 82 can flow into the surrounding portion. The water that has flown into the surrounding portion flows into the drain hole 84, and thus does not cause water leakage. However, if water other than leaking water flows into the surrounding portion, the capturing performance and the recirculating characteristics may be deteriorated. From this viewpoint, the configuration D is preferable.

The following configurations E and F are applicable to the overlapping between the connection portion and the flow path forming recess 94.

[Configuration E]: The movable range of the flow path forming recess 94 in the water discharge state includes positions where the flow path forming recess 94 overlaps the connection portion. That is, in the water discharge state, the flow path forming recess 94 overlaps the connection portion.

[Configuration F]: The movable range of the flow path forming recess 94 in the water discharge state does not include positions where the flow path forming recess 94 overlaps the connection portion. That is, in the water discharge state, the flow path forming recess 94 does not overlap the connection portion.

When the flow path forming recess 94 overlaps the connection portion, water from the hot water supply hole 80 or the cold water supply hole 82 can flow into the connection portion. The water that has flown into the connection portion flows into the drain hole 84, and thus does not cause water leakage. However, if water other than leaking water flows into the connection portion, the recirculating characteristics may be deteriorated. From this viewpoint, the configuration F is preferable.

The following configurations G and H are also applicable.

[Configuration G]: In the hot water discharge state, the flow path forming recess 94 overlaps the connection portion 144. In the mixture discharge state, the flow path forming recess 94 does not overlap the connection portion 144. In the cold water discharge state, the flow path forming recess 94 does not overlap the connection portion 144.

[Configuration H]: In the hot water discharge state, the flow path forming recess 94 does not overlap the connection portion 144. In the mixture discharge state, the flow path forming recess 94 does not overlap the connection portion 144. In the cold water discharge state, the flow path forming recess 94 overlaps the connection portion 144.

As described above, the water pressure on the primary side in the cold water supply hole 82 is generally higher than that in the hot water supply hole 80. Accordingly, water leakage is more likely to occur in the cold water supply hole 82 than in the hot water supply hole 80. From this viewpoint, the configuration G is preferable to the configuration H. Depending on the design of the fixed valve body, it may be difficult to use the configuration F, and the above configuration E may be used. For example, in the case where the configuration E is used, it is preferable to select the configuration G.

In FIG. 9, a double-headed arrow W1 indicates the width of the collection groove 140. From the viewpoint of the capturing performance and the recirculating characteristics, the width W1 is preferably greater than or equal to 0.4 mm, more preferably greater than or equal to 0.6 mm, and still more preferably greater than or equal to 0.8 mm. Considering the limited dimensions of the fixed valve body 62, the width W1 is preferably less than or equal to 1.2 mm, more preferably less than or equal to 1.0 mm, and still more preferably less than or equal to 0.8 mm.

In FIG. 9, a double-headed arrow D1 indicates the depth of the collection groove 140. From the viewpoint of the capturing performance and the recirculating characteristics, the depth D1 is preferably greater than or equal to 0.1 mm, more preferably greater than or equal to 0.3 mm, and still more preferably greater than or equal to 0.5 mm. Considering the strength of the fixed valve body 62, the depth D1 is preferably less than or equal to 0.9 mm, more preferably less than or equal to 0.7 mm, and still more preferably less than or equal to 0.5 mm. The depth D1 is measured along a direction perpendicular to the flat smooth surface PL1.

In FIG. 8, a double-headed arrow T1 indicates the shortest distance between the supply holes 80 and 82 and the collection groove 140. From the viewpoint of suppressing the occurrence of water leakage from the supply holes 80 and 82, the shortest distance T1 is preferably greater than or equal to 0.8 mm, more preferably greater than or equal to 1.0 mm, and still more preferably greater than or equal to 1.2 mm. Considering the limited dimensions of the fixed valve body 62, the shortest distance T1 is preferably less than or equal to 1.6 mm, more preferably less than or equal to 1.4 mm, and still more preferably less than or equal to 1.2 mm. The shortest distance T1 is measured along the radial direction.

The material of the fixed valve body 62 is a ceramic material. The fixed valve body 62 is produced by firing a compression-formed product of powder. When the bottom surface of the groove has corners, cracking is likely to occur at the corners of the compression-formed product. From the viewpoint of suppressing the occurrence of cracking, it is preferable that, in the cross-sectional view of the collection groove 140 (FIG. 9), the side surfaces 150 and the bottom surface 152 are smoothly connected to each other. Preferably, the bottom surface 152 is not a flat surface. Preferably, the bottom surface 152 is a curved surface that protrudes downward. From the viewpoint of suppressing the occurrence of cracking, in the cross-sectional view of the collection groove 140 (FIG. 9), the bottom surface 152 preferably has a radius of curvature of less than or equal to 0.5 mm, more preferably less than or equal to 0.4 mm, and still more preferably less than or equal to 0.3 mm. If the radius of curvature is too small, the width of the bottom surface 152 is too small and cracking is likely to occur at the lowest point of the bottom surface 152. From this viewpoint, the bottom surface 152 preferably has a radius of curvature of greater than or equal to 0.1 mm, more preferably greater than or equal to 0.2 mm, and still more preferably greater than or equal to 0.3 mm.

From the viewpoint of suppressing the occurrence of cracking, the angle $\theta 1$ (FIG. 9) formed between the side surfaces 150 is preferably greater than or equal to 20°, more preferably greater than or equal to 30°, and still more preferably greater than or equal to 40°. If the angle $\theta 1$ is too large, the groove volume relative to the groove width W1 is small, whereby the flow rate may be reduced. From this viewpoint, the angle $\theta 1$ is preferably less than or equal to 60°, more preferably less than or equal to 50°, and still more preferably less than or equal to 40°.

From the viewpoint of suppressing the occurrence of cracking, the angle $\theta 2$ (FIG. 9) formed between the flat smooth surface PL1 and each of the side surfaces 150 is preferably greater than or equal to 90°, more preferably greater than or equal to 100°, and still more preferably greater than or equal to 110°. If the angle $\theta 2$ is too large, the groove volume relative to the groove width W1 is small, whereby the flow rate may be reduced. From this viewpoint, the angle $\theta 2$ is preferably less than or equal to 130°, more preferably less than or equal to 120°, and still more preferably less than or equal to 110°.

Examples of the material of the housing include resins and metals. These resins include fiber reinforced resins. A sound produced when effecting the clicking mechanism is preferably pleasant and readily noticeable. The material of the housing affects this sound. From the viewpoint of obtaining a favorable sound and in consideration of the durability, rust resistance, and hygienic aspects, stainless alloys and fiber reinforced resins are preferable as the material of the housing. In the above-described embodiments, a glass fiber reinforced PPS resin is used. The PPS resin means a polyphenylene sulfide resin.

Examples of the material of the rotatable body include resins and metals. These resins include fiber reinforced resins. Mutual sliding of metal members at the time of operating the lever may cause unpleasant sounds. The frictional force of a sliding surface varies depending on the material of the sliding surface, and accordingly, the material affects the operability of the lever. From the viewpoint of the operability and avoiding unpleasant sounds, the material of the rotatable body is preferably a resin and more preferably a resin not containing reinforcing fibers. In the above-described embodiments, a POM resin not containing reinforcing fibers is used. The POM resin means a polyacetal resin.

Examples of the material of the lever shaft include resins and metals. These resins include fiber reinforced resins. From the viewpoint of suppressing corrosion caused by water, stainless alloys and resins are preferable. In the above-described embodiments, a stainless alloy is used.

Examples of the material of the upper member of the movable valve body include resins and metals. These resins include fiber reinforced resins. Mutual sliding of metal members at the time of operating the lever may cause unpleasant sounds. From the viewpoint of avoiding unpleasant sounds, the material of the upper member is preferably a resin. Also, when the upper member is made of a resin, the production cost of the movable valve body as a whole is reduced. In the above-described embodiments, a POM resin not containing reinforcing fibers is used.

Examples of the material of the lower member of the movable valve body include resins (including fiber reinforced resins), metals, and ceramic materials. From the viewpoint of abrasion resistance to sliding on the fixed valve body, ceramic materials are preferable. The ceramic materials are preferable also from the viewpoint of corrosion resistance to water, strength, and durability. In the above-described embodiments, a ceramic material (alumina) is used.

Examples of the material of the fixed valve body include resins (including fiber reinforced resins), metals, and ceramic materials. From the viewpoint of abrasion resistance to sliding on the movable valve body (the lower member), ceramic materials are preferable. The ceramic materials are preferable also from the viewpoint of corrosion resistance to water, strength, and durability. In the above-described embodiments, a ceramic material (alumina) is used.

Examples of the material of the packing and the O-rings include resins and rubber materials (including vulcanized rubber). Elasticity can improve the assimilability and can reduce production errors (such as dimensional errors). From these viewpoints, rubber materials are preferable. In the above-described embodiments, a rubber material is used.

Examples of the material of the base body include resins (including fiber reinforced resins) and metals. From the viewpoint of avoiding unpleasant sounds and achieving favorable strength, fiber reinforced resins are preferable and glass fiber reinforced resins are more preferable. In the above-described embodiments, a glass fiber reinforced PPS resin is used.

When a resin is used as the material of each of the above-described members, the resin is preferably a POM resin or a PPS resin. The POM resin exhibits little change with time in mechanical properties (such as tensile strength) even when it is used for a long period of time or used in a broad temperature range. In addition, the POM resin exhibits high fatigue resistance to repeated stress loading. Besides, the POM resin exhibits a small dimensional change when it absorbs water. The PPS resin is excellent in strength and rigidity, and is also excellent in abrasion resistance. Moreover, the PPS resin exhibits a small shrinkage ratio when it is formed, and thus, can achieve high dimensional accuracy. In order to further improve these properties, the above-described resins are preferably reinforced with short fibers such as glass fibers.

Regarding the above-described embodiments, the following clauses are disclosed.

[Clause 1] A mixer faucet including:
a fixed valve body including a hot water supply hole, a cold water supply hole, and a drain hole;
a movable valve body that includes a flow path forming recess and is capable of sliding on the fixed valve body; and
a handle that is capable of controlling the movable valve body,
wherein the fixed valve body includes a collection groove that is not connected to either the hot water supply hole or the cold water supply hole and is connected only to the drain hole.

[Clause 2] The mixer faucet according to clause 1,
wherein the collection groove is located radially outward of the hot water supply hole, radially outward of the cold water supply hole, or radially outward of the drain hole.

[Clause 3] The mixer faucet according to clause 1 or 2,
wherein the collection groove is located radially outward of the hot water supply hole, radially outward of the cold water supply hole, and radially outward of the drain hole.

[Clause 4] The mixer faucet according to clause 3,
wherein the collection groove is disposed continuously and wholly in a circumferential direction.

[Clause 5] The mixer faucet according to clause 4,
wherein the collection groove includes: a surrounding portion that surrounds the hot water supply hole, the cold water supply hole, and the drain hole; and a connection portion that connects the surrounding portion and the drain hole, and
the surrounding portion is disposed continuously and wholly in the circumferential direction.

In the present application, inventions other than those included in claims (including an independent claim) are also described. The forms, members, configurations, and combinations thereof described in the claims and the embodiments of the present application should be recognized as inventions based on the functions and effects of each of them.

The forms, members, configurations, and the like shown in each of the above-described embodiments are each independently applicable to all inventions described in the present application, including those set forth in the claims of the present application, even if not every form, member, or configuration described in each embodiment is used.

LIST OF REFERENCE CHARACTERS

10 Mixer faucet
14 Handle
16 Discharge portion
18 Hot water inlet pipe
20 Cold water inlet pipe
22 Discharge pipe
38 Lever assembly
40 Movable body
42 Housing
44 Rotatable body
46 Lever
48 Lever shaft
60 Movable valve body
62, 62a, 62b, 62c Fixed valve body
64 Packing
66, 67 O-ring
68 Base body
80 Hot water supply hole
82 Cold water supply hole
84 Drain hole
86 Upper member of movable valve body
88 Lower member of movable valve body
94 Flow path forming recess
140, 140a, 140b Collection groove
142, 142a, 142b Surrounding portion
144, 144a, 144b Connection portion

The invention claimed is:

1. A mixer faucet comprising: a fixed valve body including a hot water supply hole, a cold water supply hole, and a drain hole; a movable valve body that includes a flow path forming recess and is configured to slide on the fixed valve body; and a handle that is configured to control the movable valve body, wherein when the flow path forming recess overlaps the hot water supply hole and/or the cold water supply hole and also overlaps the drain hole, a water discharge state is achieved, the water discharge state including a mixture discharge state and a cold water discharge state, when the flow path forming recess overlaps the hot water supply hole and the cold water supply hole, the mixture discharge state is achieved, when the flow path forming recess overlaps the cold water supply hole and does not overlap the hot water supply hole, the cold water discharge state is achieved, the fixed valve body includes a collection groove that is not connected to either the hot water supply hole or the cold water supply hole and is connected only to the drain hole, and in the mixture discharge state or the cold water discharge state, the flow path forming recess does not overlap the collection groove.

2. The mixer faucet according to claim 1,
wherein the collection groove is located radially outward of the hot water supply hole, radially outward of the cold water supply hole, or radially outward of the drain hole.

3. The mixer faucet according to claim 1,
wherein the collection groove is connected at a single position to the drain hole.

4. The mixer faucet according to claim 1,
wherein the collection groove has a width W1 of greater than or equal to 0.4 mm and less than or equal to 1.2 mm.

5. The mixer faucet according to claim 1,
wherein the collection groove has a depth D1 of greater than or equal to 0.1 mm and less than or equal to 0.9 mm.

6. The mixer faucet according to claim 1,
wherein the collection groove includes a side surface and a bottom surface,
the bottom surface is a curved surface that protrudes downward, and
in a cross-sectional view of the collection groove, the bottom surface has a radius of curvature of greater than or equal to 0.1 mm and less than or equal to 0.5 mm.

7. The mixer faucet according to claim 1,
wherein when the hot water supply hole and the cold water supply hole are defined as supply holes, a shortest distance T1 between the collection groove and the supply holes is greater than or equal to 0.8 mm and less than or equal to 1.6 mm.

8. The mixer faucet according to claim 1,
wherein the fixed valve body includes, on an upper surface thereof, a flat smooth surface that is brought into surface contact with a lower surface of the movable valve body,
the collection groove is provided on the flat smooth surface,
the collection groove includes a side surface,
an angle θ2 formed between the flat smooth surface and the side surface is greater than or equal to 90° and less than or equal to 130°.

9. A mixer faucet comprising:
a fixed valve body including a hot water supply hole, a cold water supply hole, and a drain hole;
a movable valve body that includes a flow path forming recess and is configured to slide on the fixed valve body; and
a handle that is configured to control the movable valve body,
wherein the fixed valve body includes a collection groove that is not connected to either the hot water supply hole or the cold water supply hole and is connected only to the drain hole, and
in a water discharge state, over an entire movable range of the flow path forming recess, the flow path forming recess does not overlap the collection groove.

10. The mixer faucet according to claim 9,
wherein the collection groove is located radially outward of the hot water supply hole, radially outward of the cold water supply hole, or radially outward of the drain hole.

11. The mixer faucet according to claim 9,
wherein the collection groove is located radially outward of the hot water supply hole, radially outward of the cold water supply hole, and radially outward of the drain hole.

12. The mixer faucet according to claim 11,
wherein the collection groove is disposed continuously and wholly in a circumferential direction, the circumferential direction being the circumferential direction of a smallest enclosing circle of the fixed valve body in a plan view.

13. The mixer faucet according to claim 12,
wherein the collection groove includes: a surrounding portion that surrounds the hot water supply hole, the cold water supply hole, and the drain hole; and a connection portion that connects the surrounding portion and the drain hole, and
the surrounding portion is disposed continuously and wholly in the circumferential direction.

14. The mixer faucet according to claim 9,
wherein the collection groove is connected at a single position to the drain hole.

15. The mixer faucet according to claim 9,
wherein the collection groove has a width W1 of greater than or equal to 0.4 mm and less than or equal to 1.2 mm.

16. The mixer faucet according to claim 9,
wherein the collection groove has a depth D1 of greater than or equal to 0.1 mm and less than or equal to 0.9 mm.

17. The mixer faucet according to claim 9,
wherein the collection groove includes a side surface and a bottom surface,
the bottom surface is a curved surface that protrudes downward, and
in a cross-sectional view of the collection groove, the bottom surface has a radius of curvature of greater than or equal to 0.1 mm and less than or equal to 0.5 mm.

18. The mixer faucet according to claim 9,
wherein when the hot water supply hole and the cold water supply hole are defined as supply holes, a shortest distance T1 between the collection groove and the supply holes is greater than or equal to 0.8 mm and less than or equal to 1.6 mm.

19. The mixer faucet according to claim 9,
wherein the fixed valve body includes, on an upper surface thereof, a flat smooth surface that is brought into surface contact with a lower surface of the movable valve body,
the collection groove is provided on the flat smooth surface,
the collection groove includes a side surface,
an angle θ2 formed between the flat smooth surface and the side surface is greater than or equal to 90° and less than or equal to 130°.

20. A mixer faucet comprising:
a fixed valve body including a hot water supply hole, a cold water supply hole, and a drain hole;
a movable valve body that includes a flow path forming recess and is configured to slide on the fixed valve body; and
a handle that is configured to control the movable valve body,
wherein the fixed valve body includes a collection groove that is not connected to either the hot water supply hole or the cold water supply hole and is connected only to the drain hole, the collection groove includes: a surrounding portion that surrounds the hot water supply hole, the cold water supply hole, and the drain hole; and a connection portion that connects the surrounding portion and the drain hole, and
in a water discharge state, over an entire movable range of the flow path forming recess, the flow path forming recess does not overlap the surrounding portion.

* * * * *